Feb. 21, 1961 N. N. ALPERIN ET AL 2,972,718

SYNCHRONIZED SAMPLED DATA DIGITAL SERVO

Filed Dec. 1, 1959 2 Sheets-Sheet 1

INVENTORS
NORMAN N. ALPERIN
WARREN A. MULLE

BY

H. H. Losche
ATTORNEYS

SYNCHRONIZED SAMPLED DATA DIGITAL SERVO

Filed Dec. 1, 1959 2 Sheets-Sheet 2

INVENTORS
NORMAN N. ALPERIN
WARREN A. MULLE
BY
H. H. Losche
ATTORNEYS

United States Patent Office 2,972,718
Patented Feb. 21, 1961

2,972,718

SYNCHRONIZED SAMPLED DATA DIGITAL SERVO

Norman N. Alperin, Cinnaminson Township, Burlington County, and Warren A. Mulle, Moorestown, N.J., assignors, by mesne assignments, to the United States of America as represented by the Secretary of the Navy Filed Dec. 1, 1959, Ser. No. 856,628
8 Claims. (Cl. 328—48)

This invention relates to a counter sampling device and more particularly to a means of synchronizing the count of a decade and a binary counter system with external sampling pulses applied thereto to minimize the application of transients introduced from the external sampling pulse source to provide accurate sampling servo response.

In a servo system the position of driving or driven elements, such as the angular position of a shaft, is needed to be known at servo receiver stations for indicators or other driving or driven elements to maintain the servo transmitter and receiver, as well as related components, in synchronous operation. Servo systems incorporate computers to compute the servo position with respect to time and it is often necessary to get periodic read-out of the internal computer of the servo system for controlling external servo systems or circuitry in some synchronous relation with the first-mentioned servo system which read-out is accomplished by sampling the computer output. The problem is to synchronize the internal sampling pulses and the external sampling pulses where an internal computer is used having a decade counter and a binary counter that must be synchronized to produce a prescribed count for a particular servo system and without introducing unwanted transient pulses or counts into the sampled results.

For optimum response, a digital instrumentation servo requires data to be sampled at a rate which falls within the limits of 180 to 200 cycles per second. This sampling is accomplished by the occurrence of a pulse one microsecond wide. When an external computer requires data from the servo, it is necessary to take a new sample upon the command of the external computer. The problem which arises is to insure that this external sampling pulse will occur as close as possible to one of the servo sampling pulses, hereinafter referred to as "internal sampling pulses," so that a minimum of transients will be introduced into the servo response.

In the present invention a collection of gates and counters are used to adjust the internal sampling rate of a closed-loop digital servo to minimize transients introduced by an external sampling pulse source which occurs at a rate that is a nonintegral submultiple of the internal sampling rate. This is accomplished by utilizing a pulse generator producing pulses of a predetermined pulse repetition frequency, referred to herein as clock pulses, to drive a decade counter, the count output of which is selected to extend over a predetermined period of time. The pulse generator is also coupled to three "and-gates" which are under the gating control of a binary counter. The binary counter output is selectable for a binary number, which represents the integral number of internal sampling pulses, that are applied to one of the "and-gates" to open this gate to the passage of the clock pulses from the pulse generator upon reaching the binary number selected. This "and-gate" controls a multivibrator circuit which is bistable in either of two output conditions, one each output being applied to one each of the two remaining "and-gates." One of the latter "and-gates" has the selected decade counter output voltage representative of a number applied thereto and the other "and-gate" has a selected decade counter output voltage representative of a number of higher order applied thereto such that one of the latter two mentioned "and-gates" will be opened upon the occurrence of the bistable multivibrator output. The selected decade counter output representing the lower order number will pass a pulse from the pulse generator which passed pulse will reset the decade counter and add one into the binary counter. The pulses passed from the pulse generator in the last-mentioned condition of the "and-gates" constitute the "internal sampling pulses" of the binary servo system. The other "and-gate" will pass pulses from the pulse generator upon the other bistable condition of the multivibrator circuit and the occurrence of the selected decade counter output representing the higher order number which passed pulses will reset both the decade counter and the binary counter before starting a new cycle of operation. An external sampling source, as from an external computer or the like, is applied to the output of the last-mentioned "and-gate" which external sampling pulse will likewise reset the decade counter and the binary counter for a new cyclic count. Where the external sampling pulse rate is known, the decade counter output and the binary counter output can be selected to bring the occurrence of the sampling pulse in close following relation to the last or predetermined integral number of internal sampling pulses thereby minimizing many transient pulses introduced by the external sampling pulse source. It is, therefore, a general object of this invention to provide a system of decade and binary counters adjustable or selectable in output to produce internal sampling pulses at a rate that will establish an integral number of internal sampling pulses, the last in the cycle of which will occur in close coincidence with an external sampling pulse.

These and other objects, uses, and the attendant advantages will become more apparent as the description proceeds when considered along with the accompanying drawings in which.

Figure 1:
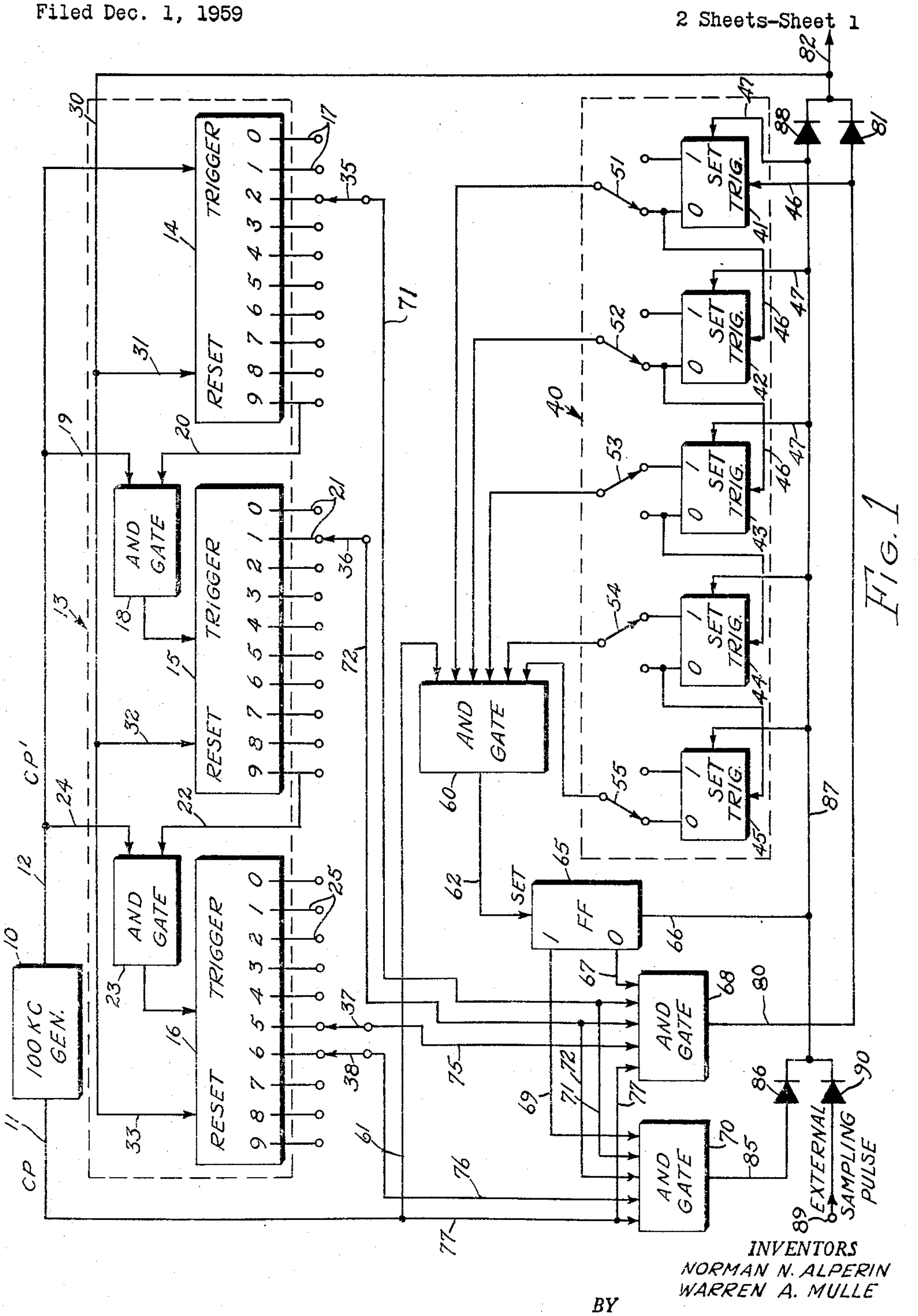
Figure 1 illustrates a block circuit diagram of the counter servo system.

Referring more particularly to Figure 1 of the drawings there is illustrated in block diagram a pulse generator 10 of the type to produce alternate pulses at a stable repetition frequency. While pulse generators of different desired frequencies may be used without departing from the spirit of this invention, the pulse generator herein is represented as a 100 kilocycle generator producing pulses at one output 11, which will hereinafter be referred to as clock pulses CP, and a second output 12 producing clock pulses CP′, the former clock pulses CP of which occur at 10 microsecond intervals and the latter clock pulses CP′ of which occur at 5 mirosecond intervals after the occurrence of the first-mentioned clock pulses.

A decade counter represented herein by the reference character 13 is illustrated as having three stages, 14, 15, and 16, to present the numerical count in proper sequence, of which the stage 14 represents the units, 15 the tens, and 16 the hundreds, of the decade counter system. The decade counter may utilize magnetron beam switch tubes which may incorporate tubes known under the trade name as "Nixie" and "Pixie" tubes to provide a visual indication of the decade count. As should be well understood in the art the units decade counter 14 is triggered by way of the conductor means 12 by the clock pulses CP′ at 10 microsecond intervals to drive the units decade counter stage 14 through zero to 9, inclusive. Upon the units stage 14 of the decade counter coming to the count of 9, a voltage output from the 9 state on the selectable tap output 17 is applied to an "and-gate" 18 through the conductor 20 which will pass the next clock pulse CP′ through the branch conductor 19 to the "and-gate" 18 to trigger the tens decade counter stage 15 to its one state as represented on the output leads 21 thereof. Counter stage 15 will remain in the one state until counter stage 14 again runs through a nine-count at which time counter stage 15 will be triggered to the two state. In like manner, the 9 count in the decade counter stage 15 will be applied in voltage form through the conductor 22 to condition an "and-gate" 23 to pass clock pulse CP′ over the branch conductor 24 to trigger the hundreds stage of the decade counter 16, each count up to nine in the counter stage 15 producing the next higher numerical count in the counter stage 16. The output of the decade counter stage 16 will appear on the output taps 25. Since the decade counters will each remain in their nine state until the next clock pulse CP′, the "and-gates" associated therewith will be held in a state to pass the next clock pulse CP′ at which time the decade counter stage with the nine thereon will be returned to its zero state.

Figure 2:
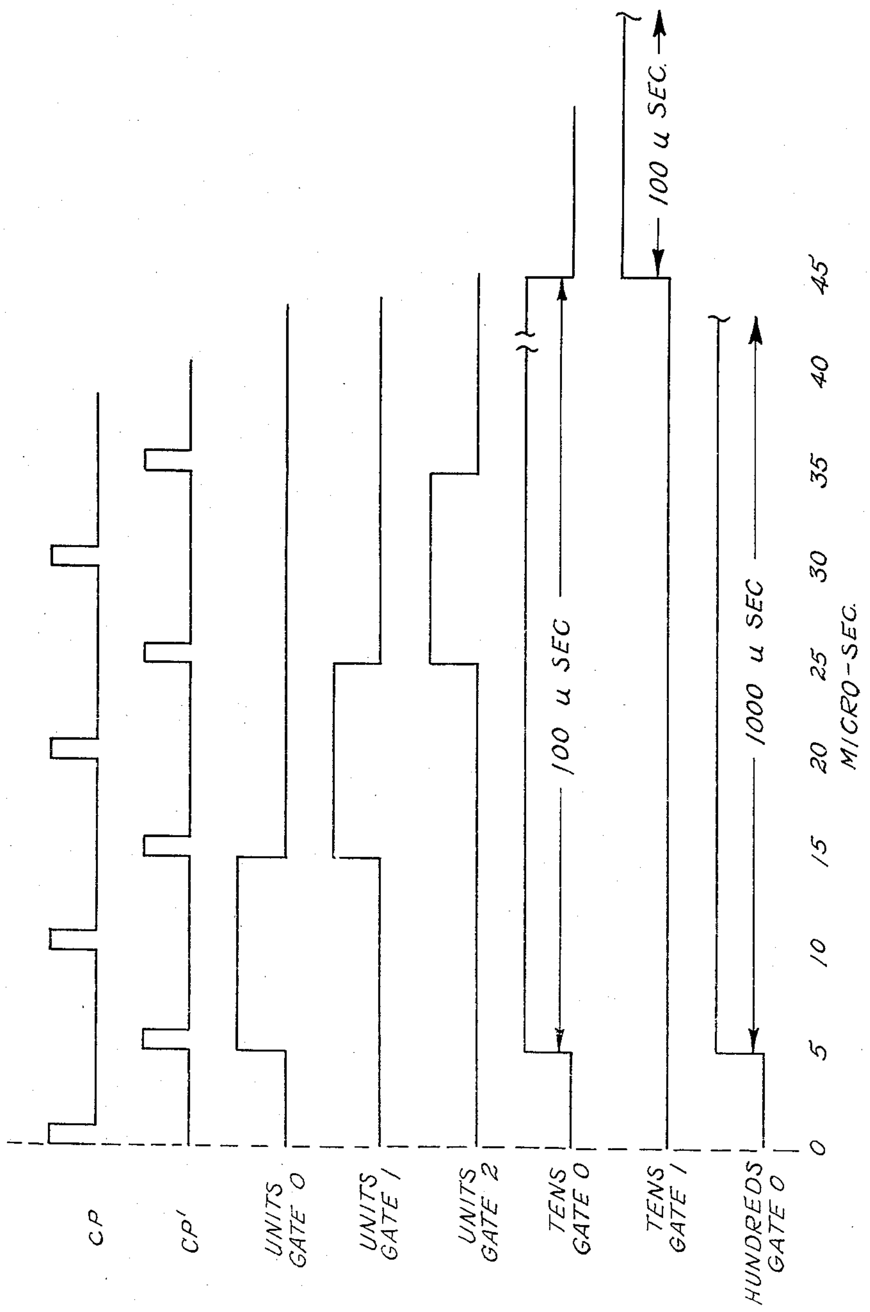
Figure 2 illustrates the pulse occurrence of the pulse generator and decade counter in time relation.

In describing the operation of the decade counter reference is made to Figure 2 wherein the clock pulses CP and clock pulses CP′ are shown which are capable of initiating the action of the decade counter. Upon the occurrence of the first clock pulse CP′ the units gate will be triggered from zero to 1 and this counter will remain in the 1 state for 10 microseconds at which time the next clock pulse CP′ will drive the units counter 14 to the 2 state which will remain for 10 microseconds until the occurrence of the third clock pulse CP′, and so on until this counter has counted to the 9 state. Upon the 9 state of stage 14 being reached the voltage from this state will be impressed on the "and-gate" 18 such that the next clock pulse CP′ will pass gate 18 to trigger the tens stage from the zero state to the 1 state. After the units stage 14 has gone through another count of 9 the tens count again will be triggered to raise the tens stage 15 to the 2 state. This count will continue to proceed until the decade counter 13 is reset by a pulse occurring in the reset circuit 30 by way of branch conductors 31, 32, and 33, in a manner well understood by those skilled in the art. It may be well understood, then, that the units stage 14 will remain in each of its numerical states for 10 microseconds, the tens stage will remain in each of its numerical states for 100 microseconds and the hundreds stage 16 will remain in each of its numerical states for 1000 microseconds, as illustrated in time relation in Figure 2 of the drawing. A selected numerical output from each of the stages is accomplished by selection of adjustable taps 35, 36, 37, and 38, on the outputs 17, 21, and 25, respectively. The selection of the numerical output from the decade counter and the use made thereof will become clear as hereinbelow described. While a three-stage decade counter is shown and described herein, it is to be understood that for some applications a more or less number of stages of a decade counter may be utilized as shown and described herein without departing from this invention.

Referring again more particularly to Figure 1 there is shown a five-stage binary counter as indicated by the reference character 40 in which the five stages 41, 42, 43, 44, and 45 are arranged in an order from right to left to place the binary digits in their proper numerical order for computation purposes. As is well understood by those skilled in the art, a binary stage usually consists of a bistable multivibrator circuit which is triggered from one state to the other on each of two outputs usually identified as the 0 and 1 state. It is also believed to be well understood by those skilled in the art that the two states of a binary counter can be changed by a triggering pulse and that the counter can also be brought back to an initial starting point by a setting or resetting pulse. The 0 and 1 state outputs of each of the stages 41 to 45, inclusive, are shown herein as well as the triggering input conductor means 46 and the setting conductor means 47 of each of the stages. A binary number of the binary counter 40 is selectable by selecting the 0 or 1 state of each of the stages 41 to 45, inclusive, by the switchable taps 51, 52, 53, 54, and 55, respectively. As illustrated in this figure the binary number selected herein is 01100 which is representative of the decimal number twelve. The selection of this binary number and the purpose therefor will become clear as the description proceeds.

The binary number output selected by the switch means 51 to 55, inclusive, is applied by conductors to "and-gate" 60 which "and-gate" also has applied thereto the clock pulse CP from the pulse generator 10 by way of conductor 11 and a branch conductor 61. Upon the occurrence of the binary number being applied to the "and-gate" 60, the gate will be opened to pass the clock pulse CP over the output 62 of this gate to a flip-flop or multivibrator circuit 65 which is bistable to rest in either its 1 or 0 state as illustrated. The multivibrator circuit 65 may be reset to its 0 state through the reset conductor 66 in a manner later to be described. The 0 state of the bistable multivibrator circuit 65 is applied by way of conductor 67 to an "and-gate" 68 and the 1 state of the bistable multivibrator circuit 65 is applied by way of the conductor 69 to an "and-gate" 70. Also applied to both "and-gates" 68 and 70 are the selected outputs of the units and tens decade counter stages 14 and 15 by way of taps 35 and 36 and conductors 71 and 72, respectively. The decade number shown herein as being applied is the number twelve. A selected output number 5 from the hundreds decade counter stage 16 is applied through the selectable tap 37 and the conductor 75 to "and-gate" 68. The numeral 6 of the hundreds decade counter stage 16 is selected by the tap 38 and applied through conductor 76 to the "and-gate" 70. Also applied to the "and-gates" 68 and 70 are the clock pulses CP coming by way of conductor 11 and branch conductor 77. The "and-gate" 68 is constructed and arranged to be opened upon the occurrence of the bistable multivibrator circuit 65 being in its 0 state along with the occurrence of the applied decade counter selected number 512 as illustrated in Figure 1. Upon gate 68 being thus opened, the clock pulse CP will be passed by the gate through an output conductor 80 to which conductor is coupled the conductor 46 for triggering the first stage 41 of the binary counter. The output conductor 80 is also coupled through a coupling diode 81 to an output conductor 82 for the system. Conductor 82 has the resetting conductor 30 of the decade counter 13 connected thereto so that any pulse occurring on the output conductor 80 passing through the "and-gate" 68 will reset the decade counter 13 at the same time that it adds in one to the binary counter 40.

Upon the occurrence of signal information applied to "and-gate" 70 by virtue of the bistable multivibrator circuit 65 being in the 1 state and the occurrence of the decade counter number 612, "and-gate" 70 will be opened (and "and-gate" 68 closed) to pass a clock pulse CP by way of conductors 11 and 77 through the "and-gate" 70 and its output conductor 85 through a coupling diode 86. The output 85 through the diode 86 is by way of output conductor means 87 to which is coupled the setting conductors 47 of the binary counter 40 such that any pulse passing through "and-gate" 70 will set the binary counter stages all in the 1 state. The purpose for setting all of the stages of the binary counter in the 1 state will be made clear hereinbelow. The output conductor 87 is coupled through a coupling diode 88 to the output conductor 82 of the system. An external sampling pulse terminal 89 is coupled through a coupling diode 90 to the output conductor 87 and through the diode 88 to the output conductor 82 of the system. The diodes 81, 88, 86, and 90 are used to isolate the incoming circuitry to avoid feedback.

As an example to prepare the counters for proper operation to bring external sampling pulses into close coincidence following internal sampling pulses, let it be assumed that the external sampling pulses to be applied to terminal 89 occur at a rate ($r$) of 15 cycles per second. If it is desirable to have a sampling rate of 200 cycles per second an integral number ($n$) of internal sampling pulses can be obtained by dividing the sampling rate by ($r$) which is:

$$\frac{200}{r}=\frac{200}{15}=13.33=n$$

The number 13, dropping the decimal part, determines the integral number 13 of internal sampling pulses to be obtained. Next, the interval between internal sampling pulses is adjusted to obtain a minimum delay between the 13th internal sampling pulse and the next external sampling pulse. To determine the proper length of this interval, $i$, $$i=\left(\frac{1}{r}\right)\left(\frac{1}{n}\right)=\left(\frac{1}{15}\right)\left(\frac{1}{13}\right)=5.128\times10^{-3}\text{ seconds}$$

$$=5128\text{ microseconds}$$

Since the 100 kilocycle pulse generator 10 producing the clock pulses CP and CP′ can determine a minimum interval of 10 microseconds, the above figure of 5128 microseconds is rounded off by dropping the least significant digit, giving a value of 5120 microseconds for the length of the internal cycle. The decade counter 13, then, will have the taps 35, 36, and 37 placed to obtain an output decade counter number 512. The decade counter output 512 is applied to "and-gate" 68 whereas the decade number output 612 is applied to the "and-gate" 70. By this construction and arrangement "and-gate" 68 is opened by the occurrence of the selected decade counter number and the selected binary number and if no external sampling pulse arrives after a period of 1000 microseconds, the time duration between the count from 500 to 600 in stage 16 of the decade counter 13, gate 70 will be opened to pass the next occurring pulse CP from the pulse generator 10 to the outputs 87 and 82 to cause a reset of both the decade and binary counters simultaneously.

In the operation of the sample data digital combination let it be assumed that the conditions are as set up in the prior example. Let it further be assumed that the system has been reset such that the binary counter 40 rests in its 11111 state and the decade counter 13 is starting count from 0. Clock pulse CP coming by way of conductors 11, 61, and 77, will be blocked in the "and-gates" 60, 68, and 70, and the clock pulse CP′ will be counted in the decade counter 13, as hereinbefore described, until the number 512 is reached. The bistable multivibrator circuit 65 being reset to its 0 state together with the application of the decade counter number 512 will open gate 68 such that the clock pulse CP coming 5 microseconds later by way of conductors 11 and 77 will pass gate 68 and will be applied over the output conductor 80 to trigger the first binary stage 41 by way of conductor 46 and to reset the decade counter 13 by way of conductor 30. Resetting of the decade counter 13 removes the decade counter output number 512 thereby causing gate 68 to close to future clock pulse CP and the binary counter stages will each be tripped to the 0 state. This in effect adds one to the binary counter. Upon the decade counter 13 again counting up to the number 512, the "and-gate" 68 will again be opened to pass the clock pulse CP 5 microseconds later to add one to the binary counter 40 and again reset decade counter 13. This operation of the decade counter counting to the number 512 causing a cyclic reset to pass a triggering pulse over the output conductor 80 through "and-gate" 68 to add one to the binary counter 40 is continued until the binary counter 40 has 13 pulses added in for a binary count. Since the binary counter 40 was started with all stages in the 1 state, thirteen pulses or counts are required to add in the binary counter to the number 01100 representing the decimal count of twelve. This actually amounts to a decimal count of thirteen by virtue of the counter stages starting in the 1 state. The pulses passed by "and-gate" 68 constitute the "internal sampling pulses" for the system. Upon the occurrence of the binary counter 40 coming to the thirteenth count in which the stages appear in the 01100 state, "and-gate" 60 will be opened such that the clock pulse CP occurring 5 microseconds later will pass this gate to set the bistable multivibrator 65 in its 1 state. The "internal sampling pulses" are thus temporarily suspended and the decade counter 13 continues in its count. If the external pulse appears on the terminal 89 as scheduled, both the decade and the binary counters will be reset, the servo data will be sampled at the output 82, and the internal sampling will resume as above described. If the external pulse does not occur on the terminal 89 within 1000 microseconds, the time it takes for the decade counter 13 to go from 512 to 612, decade counter pulse 612 together with the application of the bistable multivibrator output in the 1 state to the gate 70 will open this gate to pass clock pulse CP by way of conductors 11 and 77 through the output 85, diode 86, and output 87 to reset the binary counter 40 back to its original position of each stage being in the 1 state and will also reset the decade counter 13 by way of conductor 30. Under either condition of the appearance of the external sampling pulse being applied to terminals 89 or the passage of a clock pulse CP through the "and-gate" 70, both counters will be reset to begin the count as stated in the beginning of the statement of operation hereinabove. The proper timing of the decade counter and binary counter to condition the occurrence of "internal sampling pulses" so that the "and-gate" 60 is opened at the proper time to condition "and-gate" 68 to be open for 1000 microseconds during which time the external pulse applied to terminal 89 is to be expected, is a means of synchronizing the internal cycling period with those of the external sampling pulse. For different pulse rates of the external sampling pulses the decade counter output movable taps 35 to 38, inclusive, and the selectable taps 51 to 55, inclusive, in the binary counter should be repositioned to bring about this synchronization of the cycled integral internal and external sampling pulses. By proper selection of the decade counter outputs the amount of waiting time between internal and external pulses can be varied.

The reset pulse is applied to the "set" side of the binary counter 40 stages 41 to 45, inclusive, to avoid any ambiguous count. If this were not done the inherent delay in the multivibrator circuits constituting the stages of the binary counter 40 would cause an output from the multivibrator stage to be propagated to the adjacent multivibrator stage after the reset pulse had disappeared, which would throw an erroneous count in the binary counter. This fact must be considered as hereinbefore stated when selecting the binary counter to provide the desired output to be applied to "and-gate" 60.

While many modifications and changes may be made in the constructional details and features of this invention to adapt the system for different applications, it is to be understood that such modifications come within the spirit and scope of this invention but we desire to be limited only by the scope of the appended claims.

We claim:

1. A means synchronizing a sampled-data digital counting means comprising: a pulse generator for producing pulses of a predetermined pulse repetition frequency; first, second, and third, gating means coupled to gate pulses from said pulse generator; a first counting means coupled to said pulse generator for counting pulses therefrom, said counting means having resetting means therein and having a selectable output for pre-establishing an output count, the first counting means output being coupled to control said second and third gating means; a second counting means having resetting means therein and coupled to said first, second, and third gating means, the output of said third gating means being to said resetting means of both said first and second counting means and the output of said second gating means being applied for counting by said second counting means; a bistable network coupled to said first gating means with the two outputs thereof coupled to each of said second and third gating means for controlling said second and third gating means in co-ordination with the selectable output of said first counting means to alternatively pass the pulses from said pulse generator, the output of the second gating means being coupled to the resetting means of said first counting means; and an external sampling pulse applied to the output of said third gating means whereby said external sampling pulse and the output of said third gating means are each capable of resetting said first and second counting means and the output of said second gating means is capable of resetting said first counting means.

2. A means as set forth in claim 1 wherein said first, second, and third gating means are "and-gates," said first and second counting means are decimal and binary counters, respectively, and said bistable network is a bistable multivibrator network coupled to be reset by the output of said third "and-gate."

3. A means as set forth in claim 2 wherein said third "and-gate has a higher selectable output applied thereto than said second "and-gate" whereby said binary counting means counts the pulses passed by said "second "and-gate" to a predetermined amount applicable to condition said first "and-gate" to pass pulses of said pulse generator to change said bistable multivibrator.

4. A means as set forth in claim 3 wherein said binary counter output is from a selectable switching means for preselecting a binary number in correspondence with the preselected output count of said decimal counting means to time the output pulses of said second "and-gate" to occur in closed relation with said external sampling pulses whereby said second "and-gate" pulses passed may be sampled to minimize transient pulses.

5. A means of synchronizing a sampled-data digital servo to external control pulses comprising: a pulse generator for producing pulses at a stable pulse repetition frequency; a decade counter coupled to said pulse generator for counting the pulses therefrom, said decade counter having reset means and a selectable count output; a binary counter having a reset means and a selectable binary number output; a first "and-gate" coupled to receive said binary number output and to receive pulses from said pulse generator to pass said pulses to an output thereof when said binary number is applied; a bistable multivibrator coupled to said first "and-gate" output to produce an output voltage in one stable output state, and said multivibrator having a reset input means to produce an output voltage in another stable output state; second and third "and-gates" coupled to receive the voltage outputs rom the one and other output states, respectively, of said bistable multivibrator, coupled to receive pulses from said pulse generator, and coupled to receive selected decade counter outputs, the decade counter output to the third "and-gate" being of a higher order than that to said second "and-gate," the output of said third "and-gate" being coupled to the resetting means of said decade counter, said bistable multivibrator, and said binary counter to reset same, and the output of said second "and-gate" being coupled to the counting input of said binary counter to count the pulses from said pulse generator passed by said second "and-gate" and to the reset means of said decade counter; and an external sampling pulse input coupled to the output of said third "and-gate" to effect resetting of said decade and binary counters upon the occurrence of a pulse therefrom whereby pulses from said pulse generator passed by said second "and-gate" provide internal sampling pulses in accordance with a time sequence selected by said decade and binary counter selectable outputs to synchronize said internal sampling pulses with said external sampling pulses thereby minimizing transient pulses in data for servo systems.

6. A means as set forth in claim 5 wherein said selectable output of said decade counter is selected to provide a desired internal sampling pulse rate at the output of said second "and-gate" and the selectable output of said binary counter is selected by the quotient of the internal and external sampling pulse rates.

7. A means as set forth in claim 5 wherein said external sampling pulse input, said second "and-gate" output, and said third "and-gate" output are each isolated from feedback by diode means.

8. A means as set forth in claim 7 wherein said isolated outputs from said second and third "and-gates" constitute an output sampling circuit.

References Cited in the file of this patent

UNITED STATES PATENTS

| | | |
|---|---|---|
| 2,422,698 | Miller | June 24, 1947 |
| 2,493,627 | Grosdoff | Jan. 3, 1950 |
| 2,743,419 | Chatterton et al. | Apr. 24, 1956 |
| 2,813,199 | Sciaky et al. | Nov. 12, 1957 |